(12) United States Patent
Poddar et al.

(10) Patent No.: US 12,437,025 B2
(45) Date of Patent: *Oct. 7, 2025

(54) TWO-WAY DESCRIPTOR MATCHING ON DEEP LEARNING ACCELERATOR

(71) Applicant: Texas Instruments Incorporated, Dallas, TX (US)

(72) Inventors: Deepak Kumar Poddar, Bengaluru (IN); Soyeb Nagori, Bengaluru (IN); Hrushikesh Tukaram Garud, Parbhani (IN); Pramod Kumar Swami, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,627

(22) Filed: Nov. 1, 2023

(65) Prior Publication Data
US 2024/0078284 A1 Mar. 7, 2024

Related U.S. Application Data

(63) Continuation of application No. 17/149,474, filed on Jan. 14, 2021, now Pat. No. 11,847,184.

(30) Foreign Application Priority Data

Jan. 14, 2020 (IN) .............................. 202041001570

(51) Int. Cl.
G06F 17/16 (2006.01)
G06F 7/523 (2006.01)
G06F 9/50 (2006.01)
G06F 18/22 (2023.01)
G06V 10/75 (2022.01)

(52) U.S. Cl.
CPC .............. *G06F 17/16* (2013.01); *G06F 7/523* (2013.01); *G06F 9/5027* (2013.01); *G06F 18/22* (2023.01); *G06V 10/75* (2022.01)

(58) Field of Classification Search
CPC .......... G06F 17/16; G06F 18/22; G06F 7/523; G06F 9/5027; G06V 10/75
See application file for complete search history.

(56) References Cited

U.S. PATENT DOCUMENTS

| 11,847,184 | B2 * | 12/2023 | Poddar | G06F 17/16 |
| 2014/0368689 | A1 * | 12/2014 | Cao | G06V 10/42 |
|  |  |  |  | 348/222.1 |
| 2018/0253402 | A1 * | 9/2018 | Redfern | G06N 3/045 |

* cited by examiner

*Primary Examiner* — David F Dunphy
(74) *Attorney, Agent, or Firm* — Michael T. Gabrik; Frank D. Cimino

(57) ABSTRACT

A hardware accelerator is configured to perform matrix multiplication and/or additional operations to optimize keypoint matching. A sum of squared error (SSE) calculation may be determined by utilizing the hardware accelerator to perform matrix multiplication to obtain a cost matrix for two sets of keypoint descriptors from two images. The hardware accelerator may determine a best cost calculation for each keypoint in each direction, which is utilized to perform keypoint matching.

20 Claims, 5 Drawing Sheets

TWO-WAY DESCRIPTOR MATCHING ON DEEP LEARNING ACCELERATOR

CROSS-REFERENCE TO RELATED APPLICATIONS

This application claims priority to and the benefit of U.S. patent application Ser. No. 17/149,474, filed Jan. 14, 2021, which claims priority to India Provisional Application No. 202041001570, filed Jan. 14, 2020, each of which is hereby incorporated by reference.

BACKGROUND

Computer vision applications allow for event detection, optical flow, stereo disparity estimation, sparse matching of image points, localization, odometry, and the like. Image keypoints are commonly used to identify and describe points of interest in an image. Points of interest in an image are associated with keypoints. Keypoints have keypoint descriptors which describe visual properties, such as brightness, color, texture, and their variations in the surroundings of the point. By comparing keypoint correspondences across images, inferences can be made, such as motion, location, object detection, and the like. In a visual localization algorithm, a large number of images is captured and points of interest are detected on in individual images. Descriptors of those points of interest are stored with their three dimensional (3D) location, instead of storing the entire image as part of map data. Images are captured and again points of interest are detected and their descriptors are determined. The descriptors are matched with stored map descriptors to establish correspondences between current frame and map descriptors.

To determine keypoints in an image, a keypoint detection technique is undertaken. Conventionally, the method for keypoint detection and description is defined as a set of mathematical operations. Matching keypoint descriptors can be a taxing process. For example, keypoint matching may include matching every possible pair of correspondences between two sets of keypoints and selecting a best match for each keypoint based on keypoint descriptors.

SUMMARY

In an example, a method comprises determining a first set of keypoints from a first image and a second set of keypoints from a second image; obtaining a first descriptor matrix based on the first set of keypoints; obtaining a second descriptor matrix based on the second set of keypoints; determining, by a hardware accelerator, a cost matrix based on the first descriptor matrix and the second descriptor matrix; determining, by the hardware accelerator, a reduced cost matrix; and identifying matching keypoints based on the reduced cost matrix.

In an example, a system comprises a processor configured to execute instructions to (i) determine a first set of keypoints from a first image and a second set of keypoints from a second image, (ii) obtain a first descriptor matrix based on the first set of keypoints, in which the first descriptor matrix includes a keypoint descriptor for each of the first set of keypoints, and (iii) obtain a second descriptor matrix based on the second set of keypoints, in which the second descriptor matrix includes a keypoint descriptor for each of the second set of keypoints. The system further comprises a hardware accelerator configured to (i) determine a cost matrix based on the first descriptor matrix and the second descriptor matrix, and (ii) determine a reduced cost matrix data from the cost matrix. Matching keypoints are identified based on the reduced cost matrix.

In an example, a system comprises a processor configured to determine a first set of keypoints from a first image and a second set of keypoints from a second image, obtain a first descriptor matrix based on the first set of keypoints, in which the first descriptor matrix includes a keypoint descriptor for each of the first set of keypoints, and obtain a second descriptor matrix based on the second set of keypoints, in which the second descriptor matrix includes a keypoint descriptor for each of the second set of keypoints. The system further comprises a hardware accelerator configured to determine a cost matrix based on the first descriptor matrix and the second descriptor matrix, and determine a cost calculation based on the cost matrix, a first norm value for each keypoint descriptor of the first descriptor matrix, and a second norm value for each keypoint descriptor in the second descriptor matrix.

BRIEF DESCRIPTION OF THE DRAWINGS

For a detailed description of various examples, reference will now be made to the accompanying drawings in which.

DETAILED DESCRIPTION

Figure 1:
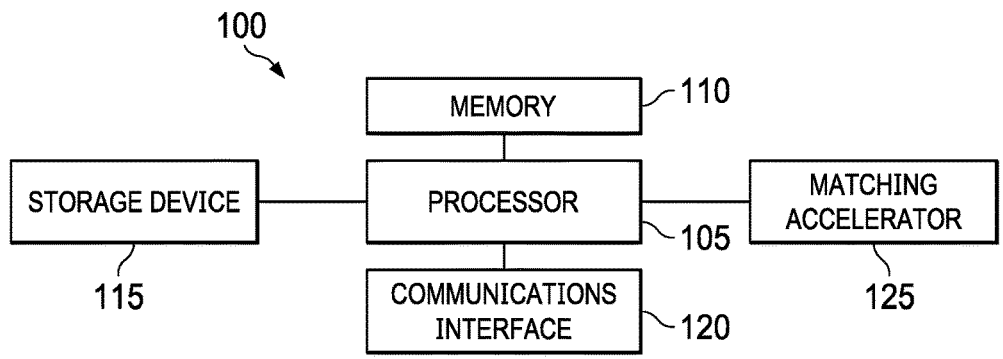
FIG. 1 illustrates a block diagram of a computing device, according to one or more embodiments.

The following description is directed to an efficient method to evaluate matching functions for establishing correspondences between two sets of keypoint descriptors, for example using a matching accelerator, or other hardware accelerator such as a matrix multiplication accelerator ("MMA") configured to perform operations which may be used for keypoint matching. Image keypoints are commonly used in computer vision applications to identify and describe the points of interest in an image. For example, a vehicle may be equipped with cameras. As it moves through an environment, images of the environment may be captured. By comparing points of interest in the images, inferences may be made, such as information about the movement of the vehicle, localization information, and the like. Keypoints include a detection score (e.g., strength) of a visual feature present at the point, and a description of the neighborhood visual properties. Those visual properties may include, for example, brightness, color, texture, and the like. Any of a variety of cost functions can be used to match multivalued feature descriptors. For example, sum of absolute difference ("SAD") and sum of squared error ("SSE") are two suitable cost function techniques.

SAD is a computationally efficient cost function. The SAD Cost function is:

$$\text{SAD Cost} = \Sigma_{l=1}^{K} \text{abs}(ai[l] - bj[l]).$$

That is, an absolute value of the differences between each pair of correspondences (wherein ai and bj represent descriptors from two different matrices of descriptors, and wherein K is the length of the descriptor) in an array of descriptors is determined.

The SSE Cost function is:

$$\text{SSE Cost} = \Sigma_{l=1}^{K} (ai[l] - bj[l])^2$$

SAD calculations may be preferred to SSE because the cost of computation of the SAD cost function is generally less than the cost of computation of the SSE function (cost in terms of computational power and time). However, while SAD may be an efficient solution for many applications, an alternative formulation of SSE may be useful. In particular, the matrix multiplication capability of the matching accelerator may be utilized for descriptor matching. The above SSE formulation can alternatively be defined as:

$$\text{SSE} = \Sigma_{l=1}^{K}(ai^2 - 2*aibj + bj^2) = |ai|^2 - 2*\Sigma_{l=1}^{K}(ai[l]*bj[l]) + |bj|^2$$

As such, the SSE formulation can be defined as a single dot product operation plus the addition of two vector norms. Accordingly, |ai| should be calculated for descriptors in a first descriptor list, while |bj| should be calculated for descriptors in a second descriptor list. In addition, $\Sigma_{l=1}^{K}(ai[l]*bj[l])$ should be calculated for all pairs of descriptors. The first descriptor list and the second descriptor list can be represented in matrix form, with each descriptor being represented as a row. This allows the matching accelerator to be used for the dot product component of an SSE cost computation. By doing so, a matrix multiplication accelerator can be used as a matching accelerator, as most of the convolution operation can be represented as matrix multiplication.

After the cost computation, a 2-way consistency check may be performed to select the best matches for each descriptor. A vertical best cost may be determined for the first descriptor matrix, and a horizontal best cost may be determined for the second descriptor matrix. The block level best cost in the horizontal and vertical directions may be processed to obtain a consolidated best cost in the horizontal and vertical directions.

The descriptor matching technique may be performed in a computing device. As illustrated in FIG. 1, the computing device 100 includes a processing element such as processing unit 105 that contains one or more hardware processors, where each hardware processor may have a single or multiple processor cores. Examples of processors include, but are not limited to, a central processing unit (CPU) or a microprocessor. Although not illustrated in FIG. 1, the processing elements that make up processor 105 may also include one or more other types of hardware processing components, such as graphics processing units (GPUs), application specific integrated circuits (ASICs), field-programmable gate arrays (FPGAs), and/or digital signal processors (DSPs). Generally, the computing device 700 may perform any of the functionality described above (e.g., in conjunction with FIGS. 2-6).

FIG. 1 illustrates that memory 110 may be operatively and communicatively coupled to processor 105. Memory 110 may be a non-transitory computer readable storage medium configured to store various types of data. For example, memory 110 may include one or more volatile devices such as random access memory (RAM). Non-volatile storage devices 120 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 120 may also be used to store programs that are loaded into the RAM when such programs executed.

Software programs may be developed, encoded, and compiled in a variety of computing languages for a variety of software platforms and/or operating systems and subsequently loaded and executed by processor 105. In one embodiment, the compiling process of the software program may transform program code written in a programming language to another computer language such that the processor 105 is able to execute the programming code. For example, the compiling process of the software program may generate an executable program that provides encoded instructions (e.g., machine code instructions) for processor 105 to accomplish specific, non-generic, particular computing functions.

After the compiling process, the encoded instructions may then be loaded as computer executable instructions or process steps to processor 105 from memory 110, and/or embedded within processor 105 (e.g., via a cache or on-board read only memory (ROM)). Processor 105 may be configured to execute the stored instructions or process steps in order to perform instructions or process steps to transform the computing device into a non-generic, particular, specially programmed machine or apparatus. Stored data, e.g., data stored by a storage 115, may be accessed by processor 105 during the execution of computer executable instructions or process steps to instruct one or more components within the computing device 100. Storage 115 may be partitioned or split into multiple sections that may be accessed by different software programs. For example, storage 115 may include a section designated for specific purposes, such as storing program instructions or data for updating software of the computing device 100. In one embodiment, the software to be updated includes the ROM, or firmware, of the computing device. In certain cases, the computing device 100 may include multiple operating systems. For example, the computing device 100 may include a general-purpose operating system which is utilized for normal operations. The computing device 100 may also include another operating system, such as a bootloader, for performing specific tasks, such as upgrading and recovering the general-purpose operating system, and allowing access to the computing device 100 at a level generally not available through the general-purpose operating system. Both the general-purpose operating system and another operating system may have access to the section of storage 115 designated for specific purposes.

The one or more communications interfaces may include a radio communications interface for interfacing with one or more radio communications devices. In certain cases, elements coupled to the processor may be included on hardware shared with the processor. For example, the communications interfaces 125, storage 115, and memory 110 may be included, along with other elements such as the digital radio, in a single chip or package, such as in a system on a chip (SOC). Computing device may also include input and/or output devices, not shown, examples of which include sensors, cameras, human input devices, such as mouse, keyboard, touchscreen, monitors, display screen, tactile or motion generators, speakers, lights, etc.

In some embodiments, computing device 100 may include a matching accelerator 125 coupled to the processor 105, memory 110, storage device 115, and/or communications interface 120. the matching accelerator 125 may be a hardware accelerator configured to perform specialized functions, for example, to match keypoints from image data. In some embodiments, matching accelerator 125 is configured to perform matrix multiplication, for example in the form of a matrix multiplication accelerator ("MMA"). As an example, the matching accelerator 125 may be configured to determine a cost matrix based on two sets of keypoint descriptors. Further, the matching accelerator 125 may be configured to reduce the cost matrix to perform a two way consistency check across best matches of keypoints. The matching accelerator 125 may be configured to perform additional or alternative functions to support keypoint matching, such as determination of absolute differences between values of descriptors, hamming distance calculations, and the like.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), a digital signal processor (DSP), etc. The software that executes the techniques may be initially stored in a computer-readable medium such as compact disc (CD), a diskette, a tape, a file, memory, or any other computer readable storage device and then loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, universal serial bus (USB) key), via a transmission path from computer readable media on another digital system, etc.

Figure 2:
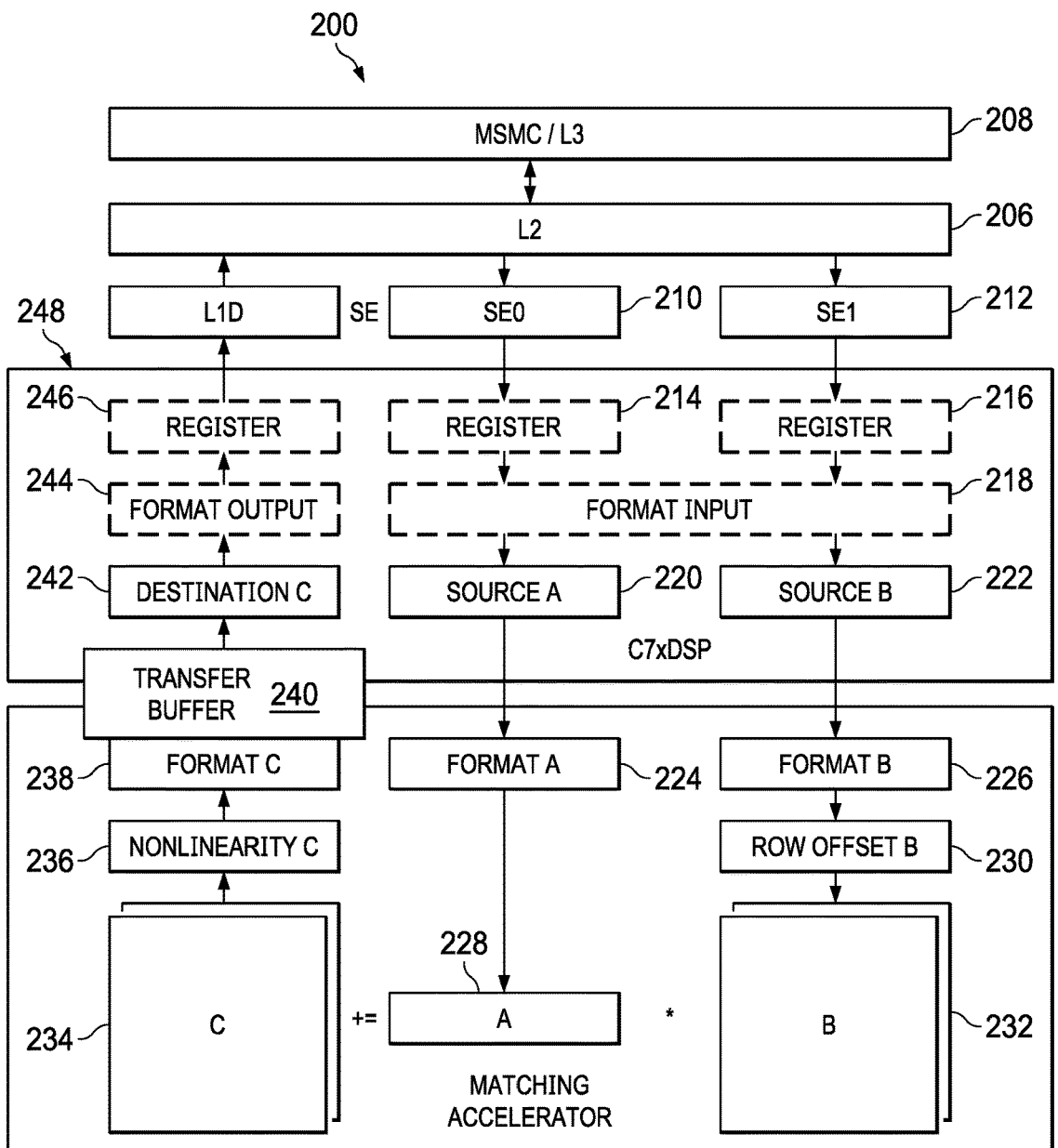
FIG. 2 depicts an example hardware accelerator, according to one or more embodiments.

FIG. 2 shows a flow diagram in a computing system 200 that includes a matching accelerator 202 coupled to a processor, for which various components are depicted. The matching accelerator 202 may include functionality to perform matrix multiplication. Matrix multiplication is a binary operation that produces a matrix from two matrices. More specifically, if a multiplier matrix A is an M×K matrix and a multiplicand matrix B is a K×N matrix, the matrix product of these two matrices is an M×N matrix C in which the m elements across a row n of A are multiplied with the m elements down a column K of B and summed to produce an element $C_{mn}$. The system includes Multicore Shared Memory Controller ("MSMC")/L3 Memory 208, and L2 memory 206.

The matching accelerator 202 includes sufficient memory to store, for example, two 32×32 multiplicand buffers 232 of 16-bit elements for storing two B matrices and two 32×32 result buffers 234 of 16-bit elements for storing two C matrices. The multiplicand buffers 232 may be referred to as B matrix buffers herein and the result buffers 234 may be referred to as C matrix buffers herein. The matching accelerator 102 further includes memory to store a 1×32 multiplier buffer 224 of 16-bit elements for storing a row of the multiplier matrix A. The multiplier buffer 228 may be referred to as the A matrix buffer herein. As is explained in more detail herein, the B matrix buffers 232 are used as ping pong buffers in some operations such that data is loaded into one of the buffers in background as data in the other buffer is used for operation execution. Similarly, the C matrix buffers 234 are used as foreground and background buffers such that, e.g., the results of operation execution are stored in one buffer while the contents of another buffer are output from the matching accelerator 202.

On each cycle, the matching accelerator 202 performs a single instruction, i.e., a Load, Store, and Execute instruction, referred to as the LSE instruction herein. As the name of this instruction implies, the matching accelerator 202 can perform a load operation, a store operation, and an execute operation in a single cycle. In general, in a cycle, a vector of data is loaded into the A matrix buffer 228 and a matrix multiplication operation is performed between a B matrix stored in a selected B matrix buffer 232 and the data vector in the A matrix buffer 228. That is, the matrix product of the data vector in the A matrix buffer 238 with each column of the B matrix in the selected B matrix buffer 232 is computed. The result of the matrix multiplication operation is a row of data elements that is stored in a row of a C matrix in a selected C matrix buffer 234. Depending on the content of the fields of the LSE instruction, a cycle can also include loading a row of data in the B matrix buffer not being used for the matrix multiplication, i.e., the background B matrix buffer, storing a row of data from a C matrix buffer into external memory, and/or performing a specified operation on the results of the matrix product operations before storing the results in the selected C matrix buffer 234.

The load operation portion of the LSE instruction includes fields identifying the location in the buffer 220 of the data to be loaded into the A matrix buffer 228, the location in the buffer 222 of the data to be loaded in a B matrix buffer 232, the B matrix buffer 232 that is the target of the load operation, and the row in target B matrix buffer to be loaded. The load operation portion also includes a field for indicating whether a load operation is to be performed.

The store operation portion of the LSE instruction includes fields identifying the location in the buffer 242 where the data in a C matrix buffer 234 is to be stored, the C matrix buffer 234 holding the data to be stored, and the row in the target C matrix buffer 234 containing the data to be stored. The store operation portion also includes a field for indicating whether a store operation is to be performed.

The execute operation portion of the LSE instructions includes fields identifying the target C matrix buffer 234 and the row in the target C matrix buffer 234 that is to receive the result of the execute operation, and the operation to be performed with the results of the matrix multiplication before storing in the target C matrix buffer 234. The operations that can be specified include =, +=, -=, or none. The = operation causes the results to be directly stored in the specified row with no alteration. The += operation causes elements in the results to be added to corresponding elements in the specified row, with the results of the additions replacing the contents of the specified row. The -= operation causes elements in the results to be subtracted from corresponding elements in the specified row, with the results of the subtractions replacing the contents of the specified row. The none operation, as the name implies, indicated that no operation is to be performed. The none operation is used, for example, during the initial load of data into a B matrix buffer 232 prior to performing the matrix multiplication or when moving the final results stored in a C matrix buffer 234 out of the matching accelerator 202.

The matching accelerator 202 further includes configurable format components 238, 224, 226 for formatting, respectively, the data output by the matching accelerator 202 and the data input to the matching accelerator 202. The format A component 224 and the format B component 226 are configurable to format the respective input data according to a specified type, e.g., 16-bit float, 16-bit fixed signed, 16-bit fixed unsigned, 8-bit fixed signed, and 8-bit fixed unsigned, and the Q point, i.e., the number of fractional bits, for fixed point inputs. The format C component 238 is configurable to format the output data according to a specified type, e.g., 16-bit float, 16-bit fixed signed, 16-bit fixed unsigned, 8-bit fixed signed, and 8-bit fixed unsigned, and the Q point, i.e., the number of fractional bits, for fixed point outputs. The format A component 224 is further configurable to define a look-up table (LUT) that allows the A data in L2 206 to be stored in 4-bit precision to save memory and expanded to 16-bit precision in the A matrix buffer 228 using a mapping of 4 bits to 16 bits that doesn't need to be uniform.

More specifically, on a cycle of the matching accelerator 202, a new row of data can be loaded into the background B matrix buffer, i.e., the B matrix buffer 232 that is not being used for execution. If the row offset values in the row offset component 230 for all elements in the row of data are zero, the data elements will be loaded in the row of the background B matrix buffer specified in the LSE instruction for the cycle. For example, when loading a new row of data in the first row of the background B matrix buffer, the first element will be loaded in row 1, column 1, the second element will be loaded in row 1, column 2, etc.

In the example device 200, the processor is a digital signal processor (DSP) that includes a level one data (L1D) cache memory, a level 2 (L2) unified instruction and data cache memory 206, and two streaming engines (SE0 and SE1) 210, 212.

Figure 3:
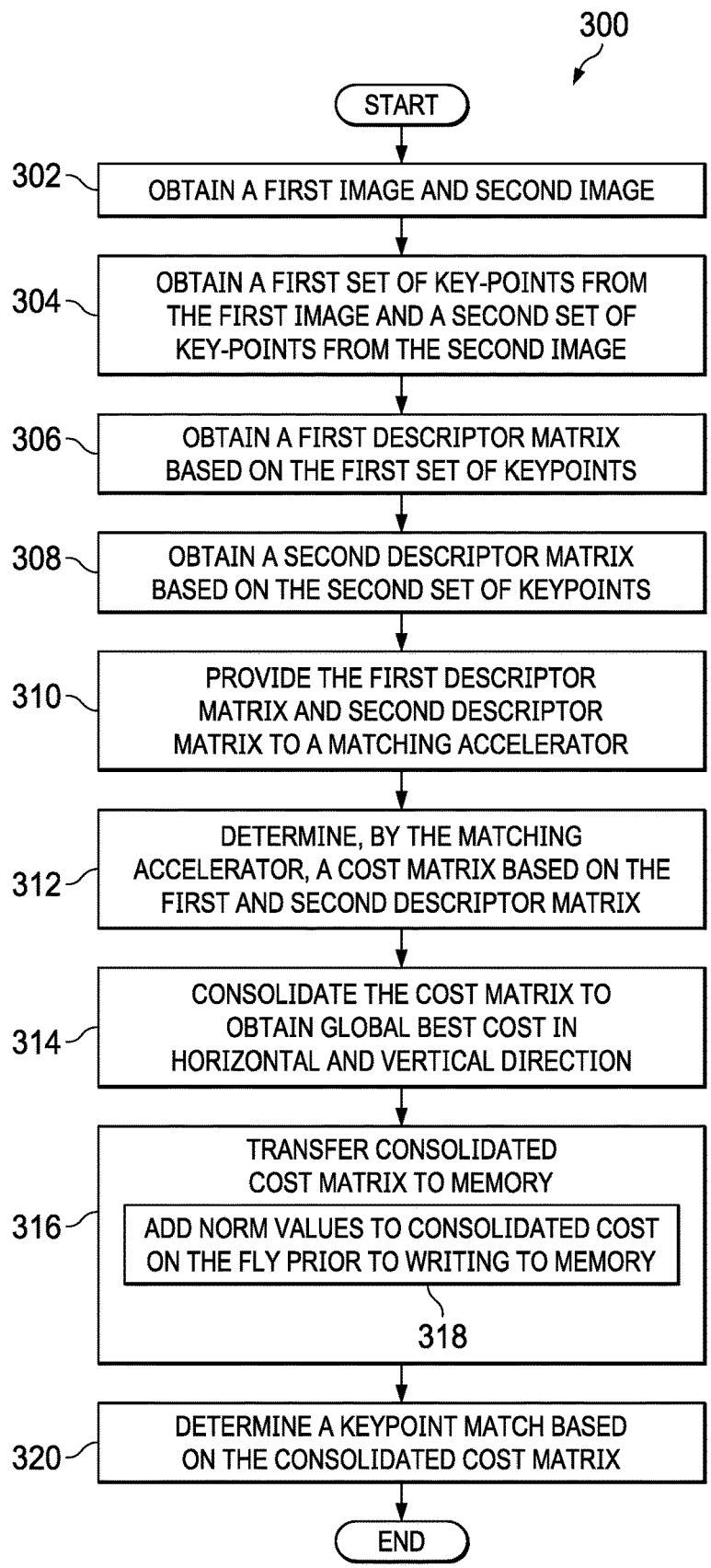
FIG. 3 depicts a flowchart of a technique for utilizing a matching accelerator for optimized keypoint matching, according to one or more embodiments.

FIG. 3 depicts a flowchart of a technique for using a hardware accelerator for keypoint matching, according to one or more embodiments. Specifically, FIG. 3 depicts a technique for utilizing a hardware accelerator configured for matrix multiplication (such as matching accelerator 125 of FIG. 1) to optimize calculation of keypoint matching. The flow chart depicts a series of steps in a particular order. However, it should be understood that the various steps may be performed in different order. Further, in some embodiments additional steps may be included, or some of the steps may be omitted. In addition, some of the steps may be performed concurrently in some embodiments.

The flowchart 300 begins at block 302, where the first of the second image are obtained. The first and second image may be two images from which keypoint matches may be identified. For example, the two images may include a current image and a reference image, two images captured from a camera over a period of time for motion tracking, or the like. In addition, the first image and second image may be captured from a local camera device, or may be obtained from one or more remote camera devices.

The flowchart 300 continues at block 304, where the first set of keypoints in the first image and a second set of keypoints for a second image are obtained. Keypoints may be detected using any keypoint detection technique, or may be provided if the keypoints and keypoint descriptors are predetermined for a particular image. In some embodiments, the keypoints may be obtained from offline-computed MAP data. The flowchart continues at block 306, where a first descriptor matrix is obtained for the first of the keypoints. The first descriptor matrix comprises a matrix of him number of keypoints having a descriptor the particular bit links (for example, 64-bit). The keypoint descriptor may be obtained from a keypoint discovery algorithm, or maybe predetermined and obtained from a source, or the like. Similarly, at block 308, a second descriptor matrix is obtained for the second set of keypoints. The second descriptor matrix comprises the matrix of N number of keypoints having a descriptor of the same length (again, for example, 64-bit).\

The flowchart continues at block 310, where the first descriptor matrix and the second descriptor matrix are provided to a matching accelerator. As described above, the matching accelerator may be a specialized hardware accelerator configured to provide functionality for matrix multiplication. At block 312, the matching accelerator determines the cost matrix based on the first and second descriptor matrix. The cost matrix is the result of the multiplication of the first and second descriptor matrices provided to the matching accelerator. Then, at block 314 the cost matrix is consolidated and reduced to obtain global best cost and horizontal and vertical directions. That is, each keypoint represented in the matrices will be matched with the best cost in accordance with the cost matrix. In doing so, a two-way consistency check may be maintained for matching. A two-way consistency check is used to determine whether a descriptor pair has a lowest cost in both direction of matching. The determination may be made, for example, using Row_min[2*i+1]=j and Col_min[2*j+1]=i, where Row_min[M×2] is a list of minimum scores and their indices in horizontal direction (that is, the best matching point from list B for point i in list A). Indices and score or both stored, which is why Row_min requires M×2. Col_min [N×2] is list of minimum scores and their location in vertical direction, (that is, the best matching point from list A for point i in list B). Accordingly, if Row_min[2*i+1]=j and Col_min[2*j+1]=i, then the (i,j) pair descriptor is declared a best match. In some embodiments, the reduced cost matrix may include a keypoint indicia for each keypoint of the first and second set of keypoints, along with a cost score.

At block 316, the consolidated cost matrix is transferred from the matching accelerator to memory. In some embodiments, as shown at block 318, norm values may be added to the consolidated cost on-the-fly prior to ready memory. The norm values, as described above, may be calculated for each descriptor in each set of keypoints. The flowchart concludes at block 320, where the processor can determine a keypoint match based on the consolidated cost matrix. The keypoint to match may be determined for one or more keypoints represented by the consolidated cost matrix.

Figure 4:
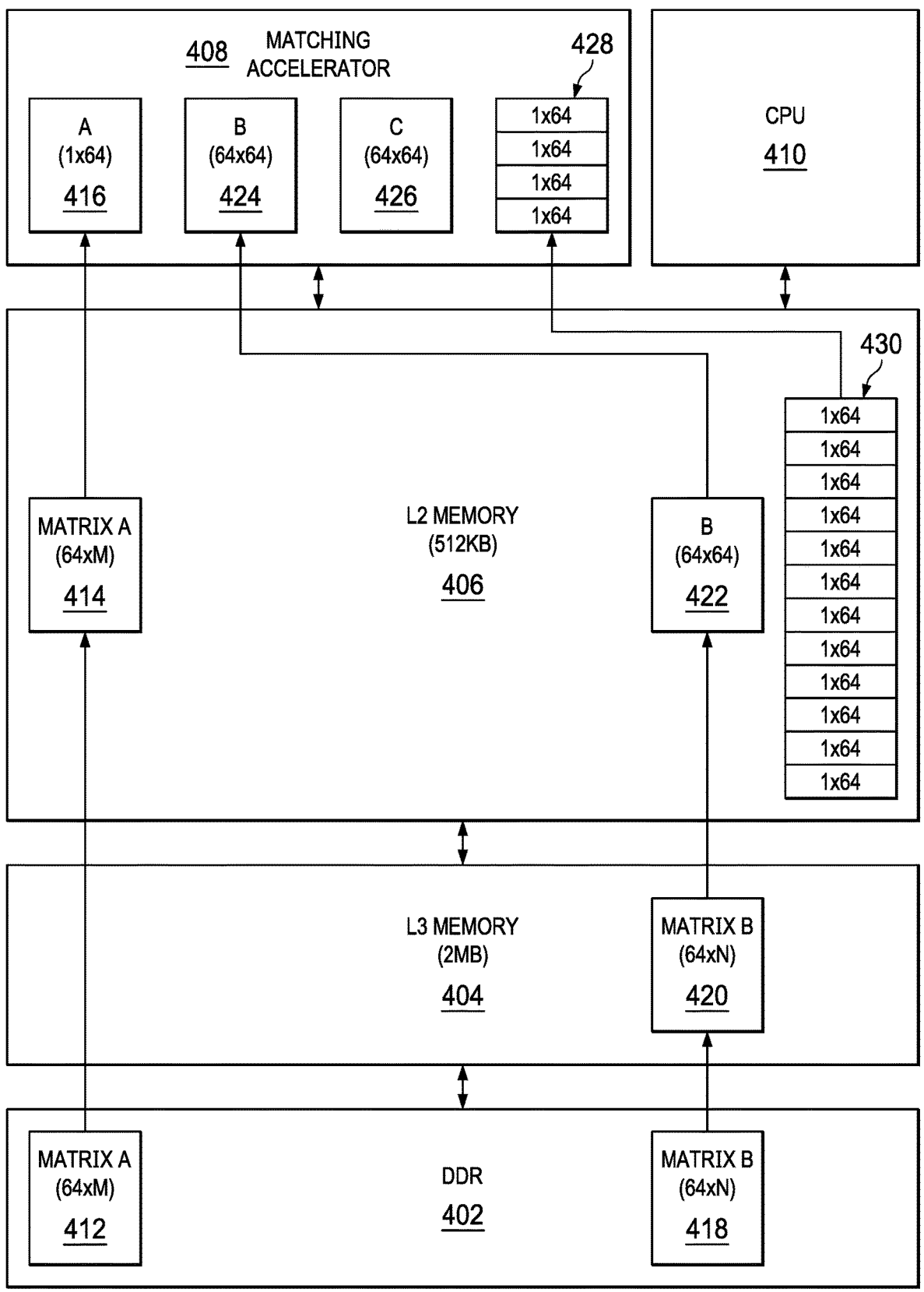
FIG. 4 depicts a flow diagram of a technique for utilizing a matching accelerator for optimized keypoint matching within a computing device, according to one or more embodiments.

FIG. 4 depicts a flow diagram for a technique for matching keypoints across images, according to one or more embodiments. The flow diagram of FIG. 4 depicts the technique described in FIG. 3 in different detail. The flow diagram of FIG. 4 is depicted across double data rate memory (DDR) 402, L3 Memory 404, L2 Memory 406, as well as matching accelerator 408 and CPU 410. The flow diagram begins at 412, where a first matrix (Matrix A 412) is loaded from DDR 402 to L2 Memory 406 (depicted as Matrix A 414). Matrix A 412 includes a set of keypoint descriptors from a first image. The keypoint descriptors may be of a set length. As shown, Matrix A 412 includes M keypoints of a 64 bit length. Similarly, at 418, a second matrix (Matrix B 418) is loaded from DDR 402 to L2 Memory 420 (depicted as Matrix B 420). Matrix B 418 includes a set of keypoint descriptors from a first image. The keypoint descriptors may be of a set length. As shown, Matrix A 412 includes N keypoints of a 64 bit length.

The flowchart continues by bringing a chunk of Matrix B 420 from L3 Memory 404 to L2 Memory 406 (as depicted as Matrix B 422). The chunk may be, for example, a 64×64 matrix. A vector from matrix A 414 is loaded into matching accelerator 408, as vector A 416. the matching accelerator 408 then executes an operation with the A vector 416 and the B panel 424 to generate one row of output of the C panel 426. The next A vector 416 is then loaded into the matching accelerator and the process is repeated to obtain additional rows of output of the C panel 426. In addition, the matching accelerator 408 may perform a best cost calculation for the vertical and horizontal direction of the C panel 426 to obtain the reduced cost matrix, depicted as four vectors at 428. The reduced matrix is then transferred from a buffer in the matching accelerator to L2 memory at 430. In some embodiments, the remainder of the data, such as the full C panel 426, may be discarded and not written to memory.

The next background B panel 422 from Matrix B 420 is loaded in the matching accelerator 408. The A vectors 416 are then iteratively used for operation with the B panel 424 to obtain additional rows of output for the C panel 426. The process is repeated for all chunks in the B matrix 420. Upon completion of operation against all chunks of the B matrix 420, the final consolidated cost matrix in the form of vectors 430 may be processed by the CPU 410 to determine a global best cost in the horizontal and vertical direction (that is, for each set of keypoints in the A matrix 412 and B matrix 418).

Figure 5:
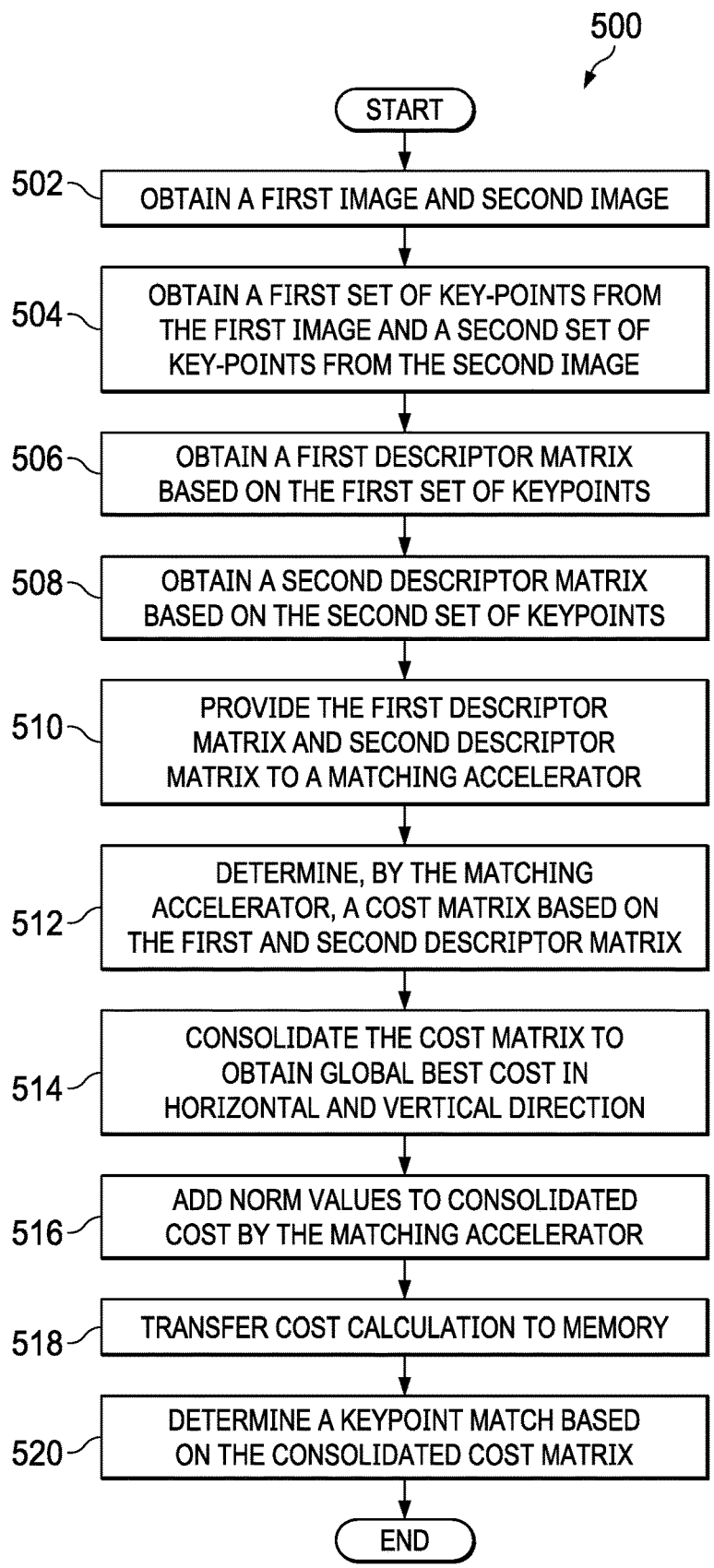
FIG. 5 depicts a flowchart of an additional technique for utilizing a matching accelerator for optimized keypoint matching, according to one or more embodiments.

Turning to FIG. 5, a flowchart is presented of a technique for using a specialized hardware accelerator for keypoint matching, according to one or more embodiments. Specifically, FIG. 5 depicts a technique for utilizing a hardware accelerator configured for matrix multiplication and additional functionality to optimize calculation of keypoint matching, such as matching accelerator 125. The distinction between the flow of FIG. 3 and the flow of FIG. 5 is that the technique described with respect to FIG. 5 utilizes a matching accelerator that has been configured for additional operations besides matrix multiplication. The flow chart depicts a series of steps in a particular order. However, it should be understood that the various steps may be performed in different order. Further, his embodiments additional steps may be included, or some of the steps may be omitted. In addition, some of the steps may be performed concurrently in some embodiments.

The flowchart 500 begins at block 502, where the first of the second image are obtained. The first and second image maybe two images from which keypoint matches maybe identified. For example, the two images may include a current image and a reference image, to images captured from a camera over a period of time for motion tracking, or the like. In addition, the first image and second image may be captured from a local camera device, or may be obtained from one or more remote camera devices.

The flowchart 500 continues at block 504, where the first set of keypoints in the first image and a second set of keypoints for a second image are obtained. Keypoints may be detected using any keypoint detection technique, or maybe provided if the keypoints are predetermined. The flowchart continues at block 506, where a first descriptor matrix is obtained for the first of the keypoints. The first descriptor matrix comprises a matrix of him number of keypoints having a descriptor the particular bit links (for example, 64-bit). The keypoint descriptor may be obtained from a keypoint discovery algorithm, or maybe predetermined and obtained from a source, or the like. Similarly, at block 508, a second descriptor matrix is obtained for the second set of keypoints. The second descriptor matrix comprised the matrix of in number of keypoints having a descriptor of the same length (again, for example, 64-bit).

The flowchart continues at block 510, where the first descriptor matrix and the second descriptor matrix are provided to a matching accelerator. As described above, the matching accelerator may be a specialized hardware accelerator configured to provide functionality for matrix multiplication. At block 512, the matching accelerator determines the cost matrix based on the first and second descriptor matrix. The cost matrix is the result of the multiplication of the first and second descriptor matrices provided to the matching accelerator. Then, at block 514 the cost matrix is consolidated and reduced to obtain global best cost and horizontal and vertical directions. That is, each keypoint represented in the matrices will be matched with the best cost in accordance with the cost matrix. In doing so, a two-way consistency check may be maintained for matching. A two-way consistency check is used to determine whether a descriptor pair has a lowest cost in both direction of matching. The determination may be made, for example, using Row_min[2*i+1]=j and Col_min[2*j+1]=i, where Row_min[M×2] is a list of minimum scores and their indices in horizontal direction (that is, the best matching point from list B for point i in list A). As described above, M×2 is used because the indices and scores are both stored for each element. Col_min[N×2] is list of minimum scores and their location in vertical direction, (that is, the best matching point from list A for point i in list B). In some embodiments, the reduced cost matrix may include a keypoint indicia for each keypoint of the first and second set of keypoints, along with a cost score.

At block 516, supplemental data is added to the cost value on the fly while transferring the cost from the C panel to memory. For example, in some embodiments, the norm values are added to the consolidated cost matrix to obtain an SSE cost. The norm values, as described above, may be calculated for each descriptor in each set of keypoints, such as norm of ith descriptor and jth descriptor is added in cross correlation cost of Cij to make cross correlation cost into SSE cost. The norm of all descriptors in a list A and list B may be calculated only once. The SSE cost calculation is then written to memory at 518. The flowchart concludes at block 520, where the processor can determine a keypoint match based on the consolidated cost matrix. The keypoint to match may be determined for one or more keypoints represented by the consolidated cost matrix.

Figure 6:
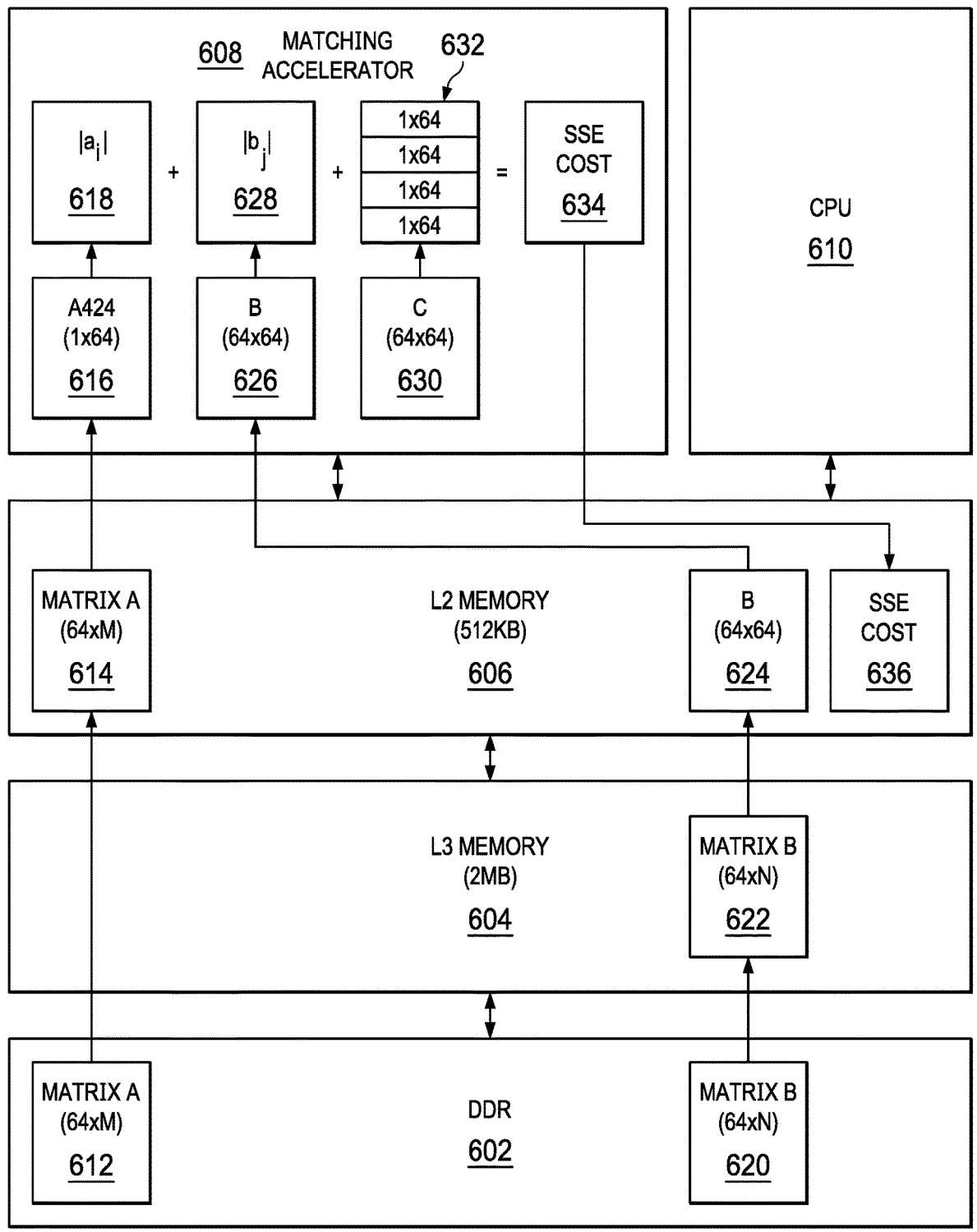
FIG. 6 depicts a flow diagram of an additional technique for utilizing a matching accelerator for optimized keypoint matching within a computing device, according to one or more embodiments.

FIG. 6 depicts a flow diagram for a technique for matching keypoints across images, according to one or more embodiments. In some embodiments, the flow diagram of FIG. 6 depicts the technique described in FIG. 5 in different detail. The flow diagram is depicted across DDR 602, L3 Memory 604, L2 Memory 606, as well as matching accelerator 608 and CPU 610. The flow diagram begins where a first matrix (Matrix A 612) is loaded from DDR 602 to L2 Memory 606 (depicted as Matrix A 614). Matrix A 612 includes a set of keypoint descriptors from a first image. The keypoint descriptors may be of a set length. As shown, Matrix A 612 includes M keypoints of a 64 bit length. Similarly, a second matrix (Matrix B 620) is loaded from DDR 602 to L2 Memory 606 (depicted as Matrix B 622). Matrix B 622 includes a set of keypoint descriptors from a first image. The keypoint descriptors may be of a set length. As shown, Matrix B 620 includes N keypoints of a 64 bit length.

The flow diagram continues by bringing a chunk of Matrix B 622 from L3 Memory 604 to L2 Memory 606 (as depicted as Matrix B 624). The chunk may be, for example, a 64×64 matrix. A vector from matrix A 614 is loaded into matching accelerator 608, as vector A 616. The matching accelerator 608 then executes an operation with the A vector 616 and the B panel 626 to generate one row of output of the C panel 630. The next A vector 616 is then loaded into the matching accelerator and the process is repeated to obtain additional rows of output of the C panel 630. In addition, the matching accelerator 608 may perform a best cost calculation for the vertical and horizontal direction of the C panel 630 to obtain the reduced cost matrix, depicted as four vectors at 632.

The matching accelerator may be configured to perform additional functions, such as hamming distance and other basic cost operators. Accordingly, matching accelerator 608 may determine the A norm values 618 for the A panel 616 and the B panel 626 as the B norm values 628. The norm values, as described above, may be calculated for each descriptor in each set of keypoints. The A norm values 618 and B norm values 628 are added to the consolidated cost matrix to obtain an SSE cost 632. The SSE cost 632 is then transferred from a buffer in the matching accelerator to L2 memory at 636.

The next background B panel 624 from Matrix B 622 is loaded in the matching accelerator 608. The A vectors 616 are then iteratively used for operation with the B panel 626 to obtain additional rows of output for the C panel 630. The process is repeated for all chunks in the B matrix 622. Upon completion of operation against all chunks of the B matrix 622, the final SSE Cost calculation 634 may be written to L2 memory 606 at 636, and processed by the CPU 610 to determine a global best cost in the horizontal and vertical direction. In some embodiments, the remainder of the data, such as the full C panel 630, may be discarded and not written to memory.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. A method comprising:
    determining a first set of keypoints from a first image and a second set of keypoints from a second image;
    obtaining a first descriptor matrix based on the first set of keypoints;
    obtaining a second descriptor matrix based on the second set of keypoints;
    determining, by a hardware accelerator, a cost matrix based on the first descriptor matrix and the second descriptor matrix;
    determining, by the hardware accelerator, a reduced cost matrix; and
    identifying matching keypoints based on the reduced cost matrix.

2. The method of claim 1, wherein the cost matrix comprises a product of multiplication of the first descriptor matrix and the second descriptor matrix.

3. The method of claim 2, wherein:
    the first descriptor matrix includes a keypoint descriptor for each of the first set of keypoints, and the second descriptor matrix includes a keypoint descriptor for each of the second set of keypoints; and
    the determining of the reduced cost matrix includes identifying, for each keypoint represented in the first descriptor matrix and the second descriptor matrix, a best cost.

4. The method of claim 3, further comprising determining a first norm value for each keypoint descriptor of the first descriptor matrix, and a second norm value for each keypoint descriptor in the second descriptor matrix.

5. The method of claim 4, further comprising:
    adding the first norm value and the second norm value to the reduced cost matrix to obtain a cost calculation; and
    writing the cost calculation to memory,
    wherein the cost matrix is not written to memory.

6. The method of claim 5, further comprising:
    determining a global best cost based on the reduced cost matrix, the first norm value, and the second norm value.

7. The method of claim 6, further comprising:
    identifying a keypoint match across the first image and the second image based on the determined global best cost.

8. A system comprising:
    a processor configured to:
        determine a first set of keypoints from a first image and a second set of keypoints from a second image,
        obtain a first descriptor matrix based on the first set of keypoints, in which the first descriptor matrix includes a keypoint descriptor for each of the first set of keypoints, and
        obtain a second descriptor matrix based on the second set of keypoints, in which the second descriptor matrix includes a keypoint descriptor for each of the second set of keypoints; and
    a hardware accelerator configured to:
        determine a cost matrix based on the first descriptor matrix and the second descriptor matrix, and
        determine a reduced cost matrix from the cost matrix;
    wherein
    one of the processor and the hardware accelerator identify matching keypoints based on the reduced cost matrix.

9. The system of claim 8, wherein the cost matrix comprises a product of multiplication of the first descriptor matrix and the second descriptor matrix.

10. The system of claim 9, wherein the first descriptor matrix includes a keypoint descriptor for each of the first set of keypoints, and the second descriptor matrix includes a keypoint descriptor for each of the second set of keypoints; and the determining of the reduced cost matrix includes identifying, for each keypoint represented in the first descriptor matrix and the second descriptor matrix, a best cost.

11. The system of claim 10, wherein one or the processor and the hardware accelerator is further configured to determine a first norm value for each keypoint descriptor of the first descriptor matrix, and a second norm value for each keypoint descriptor in the second descriptor matrix.

12. The system of claim 11, further comprising a memory, wherein one or the processor and the hardware accelerator is further configured to:
    add the first norm value and the second norm value to the reduced cost matrix to obtain a cost calculation; and
    write the cost calculation to the memory.

13. The system of claim 12, wherein one of the processor and the hardware accelerator is further configured to determine a global best cost based on the reduced cost matrix, the first norm value, and the second norm value.

14. The system of claim 13, wherein, to identify matching keypoints, one of the processor and the hardware accelerator is further configured to identify a keypoint match across the first image and the second image based on the determined global best cost.

15. A system comprising:
a processor configured to:
determine a first set of keypoints from a first image and a second set of keypoints from a second image,
obtain a first descriptor matrix based on the first set of keypoints, in which the first descriptor matrix includes a keypoint descriptor for each of the first set of keypoints, and
obtain a second descriptor matrix based on the second set of keypoints, in which the second descriptor matrix includes a keypoint descriptor for each of the second set of keypoints; and
a hardware accelerator configured to:
determine a cost matrix based on the first descriptor matrix and the second descriptor matrix, and
determine a cost calculation based on the cost matrix, a first norm value for each keypoint descriptor of the first descriptor matrix, and a second norm value for each keypoint descriptor in the second descriptor matrix.

16. The system of claim 15, wherein the hardware accelerator is further configured to determine a reduced cost matrix comprising data indicating, for each of the first set of keypoints and the second set of keypoints, a keypoint indicia and a cost score, wherein the cost calculation is determined based on the reduced cost matrix.

17. The system of claim 16, wherein the hardware accelerator is further configured to:
add the first norm value and the second norm value to the reduced cost matrix to obtain the cost calculation; and
write the cost calculation to memory.

18. The system of claim 16, wherein the reduced cost matrix comprises a best cost for each keypoint represented in the first descriptor matrix and the second descriptor matrix.

19. The system of claim 15, wherein the cost matrix comprises a product of multiplication of the first descriptor matrix and the second descriptor matrix.

20. The system of claim 18, wherein one of the processor and the hardware accelerator is configured to:
identify a keypoint match across the first image and the second image based on the best cost.

* * * * *